(12) United States Patent
Rhee et al.

(10) Patent No.: US 10,289,843 B2
(45) Date of Patent: May 14, 2019

(54) EXTRACTION AND COMPARISON OF HYBRID PROGRAM BINARY FEATURES

(71) Applicant: NEC Laboratories America, Inc., Princeton, NJ (US)

(72) Inventors: Junghwan Rhee, Princeton, NJ (US); Zhichun Li, Princeton, NJ (US); Zhenyu Wu, Plainsboro, NJ (US); Kangkook Jee, Princeton, NJ (US); Guofei Jiang, Princeton, NJ (US)

(73) Assignee: NEC Corporation, Tokyo (JP)

( * ) Notice: Subject to any disclaimer, the term of this patent is extended or adjusted under 35 U.S.C. 154(b) by 234 days.

(21) Appl. No.: 15/479,928

(22) Filed: Apr. 5, 2017

(65) Prior Publication Data

US 2017/0293761 A1 Oct. 12, 2017

Related U.S. Application Data

(60) Provisional application No. 62/318,844, filed on Apr. 6, 2016.

(51) Int. Cl.
*G06F 21/56* (2013.01)
*G06F 11/36* (2006.01)

(52) U.S. Cl.
CPC ........ *G06F 21/563* (2013.01); *G06F 11/3688* (2013.01); *G06F 11/3692* (2013.01); *G06F 21/564* (2013.01); *G06F 2221/033* (2013.01)

(58) Field of Classification Search
None
See application file for complete search history.

(56) References Cited

U.S. PATENT DOCUMENTS

| 6,775,780 | B1 | 8/2004 | Muttik | |
|---|---|---|---|---|
| 9,215,245 | B1 * | 12/2015 | Rajab | H04L 63/1433 |
| 2006/0143713 | A1 | 6/2006 | Challener et al. | |
| 2007/0239993 | A1 | 10/2007 | Sokolsky et al. | |
| 2011/0289483 | A1 * | 11/2011 | Williams | G06F 8/36 717/126 |

* cited by examiner

*Primary Examiner* — Joseph P Hirl
*Assistant Examiner* — Hassan Saadoun
(74) *Attorney, Agent, or Firm* — Joseph Kolodka

(57) ABSTRACT

Systems and methods for identifying similarities in program binaries, including extracting program binary features from one or more input program binaries to generate corresponding hybrid features. The hybrid features include a reference feature, a resource feature, an abstract control flow feature, and a structural feature. Combinations of a plurality of pairs of binaries are generated from the extracted hybrid features, and a similarity score is determined for each of the pairs of binaries. A hybrid difference score is generated based on the similarity score for each of the binaries combined with input hybrid feature parameters. A likelihood of malware in the input program is identified based on the hybrid difference score.

20 Claims, 8 Drawing Sheets

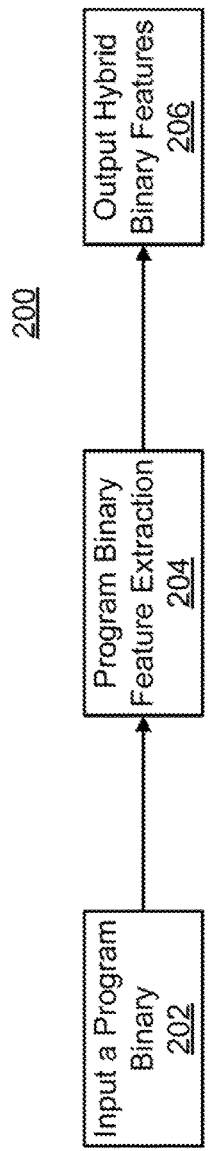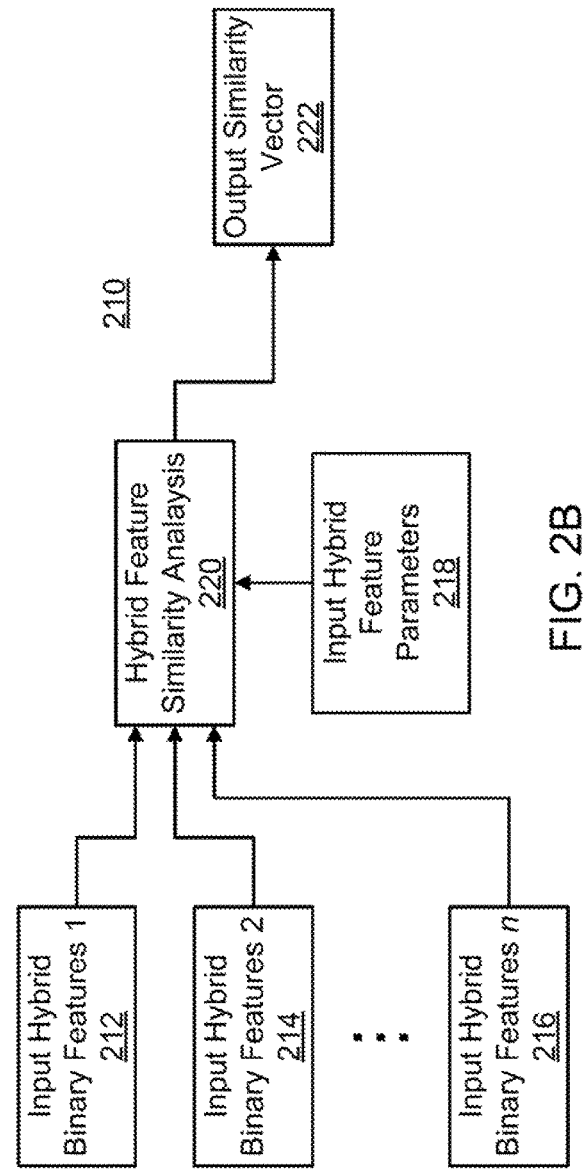

EXTRACTION AND COMPARISON OF HYBRID PROGRAM BINARY FEATURES

RELATED APPLICATION INFORMATION

This application claims priority to provisional application No. 62/318,844, filed on Apr. 6, 2016, incorporated herein by reference in its entirety.

BACKGROUND

Technical Field

The present invention relates to extraction and comparison of program features, and more particularly to detection and prevention of malicious software attacks by extraction and comparison of hybrid program binary features.

Description of the Related Art

Program binaries are a critical aspect of cyber security to understand the characteristics of programs. Benign software and malware are distributed as program binaries. Inspecting their distribution and runtime behavior is an important task done by many cyber security solutions such as anti-virus software.

Conventional anti-virus products have used binary signatures to identify malware, with hash values being commonly used for unique identification of a program binary. This may be categorized as one feature based on the content (e.g., the entire binary, or a particular section or sections). However, a hash value of binary content is sensitive to small changes, and thus any difference of even a single bit in the binary results in an entirely different hash value, thus not providing accurate or reliable results using such systems and methods. Moreover, the amount of difference in the binary content is not well represented in the difference of bash values.

In other conventional approaches, control flow information (e.g., CPU instructions, system calls) of programs has been used in an attempt to determine similarities of malware families. However, these approaches are not effective in similarity comparison, at least partly due to sensitivity in benign software as well as malware. Therefore, such methods are not effective in accurately determining similarity of programs.

Benign software has many versions for different platforms and patches. Furthermore, even though their source code may be very similar, once it is compiled into the binary format, its instruction structure becomes significantly different due to algorithm and optimization of compilers. Moreover, with respect to malicious software (malware), malware writers use variations of code (e.g., polymorphic malware code), which effectively confuses and renders conventional approaches, such as those discussed above, inaccurate and ineffective. Thus, reliable and effective characterization and similarity comparison of program binaries is an unsolved problem, as conventional approaches are not reliable or effective enough to determine, for example, similar benign programs and malware families accurately.

SUMMARY

According to an aspect of the present principles, a method is provided for identifying similarities in program binaries, including extracting program binary features from one or more input program binaries to generate corresponding hybrid features. The hybrid features include a reference feature, a resource feature, an abstract control flow feature, and a structural feature. Combinations of a plurality of pairs of binaries are generated from the extracted hybrid features, and a similarity score is determined for each of the pairs of binaries. A hybrid difference score is generated based on the similarity score for each of the binaries combined with input hybrid feature parameters. A likelihood of malware in the input program is identified based on the hybrid difference score.

According to another aspect of the present principles, a system is provided for identifying similarities in program binaries. The system includes a processor coupled to a memory in which the processor is configured to extract program binary features from one or more input program binaries to generate corresponding hybrid features. The hybrid features include a reference feature, a resource feature, an abstract control flow feature, and a structural feature. Combinations of a plurality of pairs of binaries are generated from the extracted hybrid features, and a similarity score is determined for each of the pairs of binaries. A hybrid difference score is generated based on the similarity score for each of the binaries combined with input hybrid feature parameters. A likelihood of malware in the input program is identified based on the hybrid difference score.

According to another aspect of the present principles, a non-transitory computer readable medium is provided for identifying similarities in program binaries, including extracting program binary features from one or more input program binaries to generate corresponding hybrid features. The hybrid features include a reference feature, a resource feature, an abstract control flow feature, and a structural feature. Combinations of a plurality of pairs of binaries are generated from the extracted hybrid features, and a similarity score is determined for each of the pairs of binaries. A hybrid difference score is generated based on the similarity score for each of the binaries combined with input hybrid feature parameters. A likelihood of malware in the input program is identified based on the hybrid difference score These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 2A is a block/flow diagram illustrating a high-level system/method for program binary feature extraction, in accordance with the present principles;

FIG. 2B is a block/flow diagram illustrating a high-level system/method for hybrid feature similarity analysis, in accordance with the present principles;

DETAILED DESCRIPTION OF PREFERRED EMBODIMENTS

Figure 1:
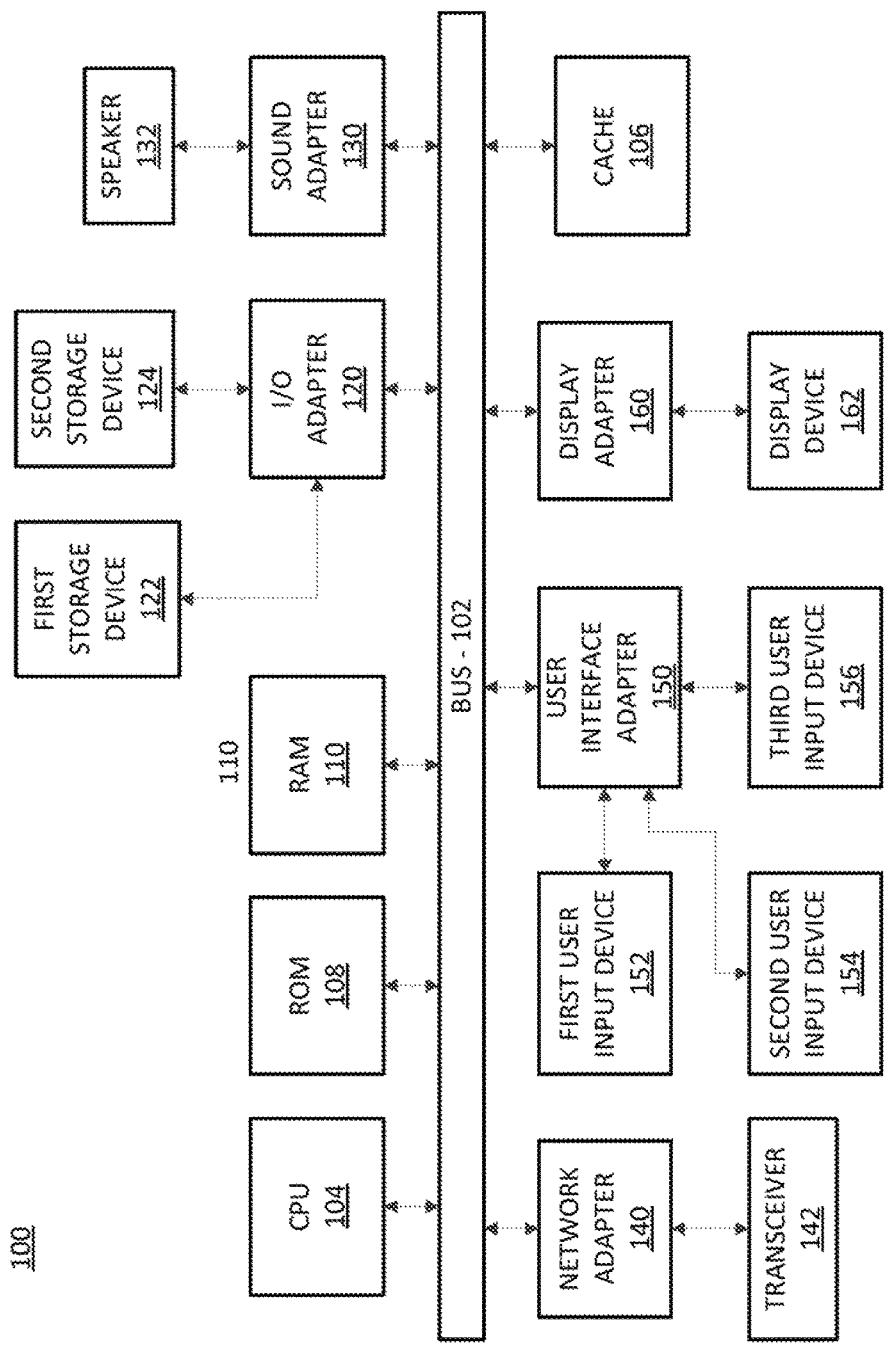
FIG. 1 is a block/flow diagram illustrating an exemplary processing system to which the present principles may be applied, in accordance with the present principles.

In accordance with the present principles, systems and methods are provided for extraction and comparison of hybrid binary program features.

In a particularly useful embodiment, a system and method for detecting and/or preventing malicious software (malware) attacks on one of more computer systems by extraction and comparison of hybrid binary program features is provided in accordance with the present principles.

In one embodiment, the present principles may be employed as a practical solution for protecting one or more computing systems from malware attacks as, for example an integrated virus definition updater for antivirus protection systems. Program binaries are a critical aspect of cyber security to understand the characteristics of programs. Benign software and malware are distributed as program binaries. Inspecting their distribution and runtime behavior is an important task, as performed by many cyber security solutions (e.g., anti-virus software).

It is well known that modern computing systems use many programs, and the complexity of computer systems often requires multiple programs to operate together to implement functionalities. Moreover, the same software may be packaged and distributed as many different versions due to, for example, diverse operating systems and platforms. Each operating system may have multiple versions (e.g., Service Packs in Windows, distribution versions in Linux, etc.). In addition, programs are frequently recompiled or patched due to numerous errors and security vulnerabilities. For instance, modern operating systems issue frequent distribution and updates of new versions of programs for any of a plurality of reasons.

Due to these reasons, there are numerous program binaries deployed and updated daily in enterprise environments. This makes monitoring and analysis of program a difficult challenge for cyber security systems and methods. Anti-virus companies have been focusing huge amounts of effort and resources to analyze new malware and update their binary signature databases. However, existing approaches to analyze and categorize binaries based signatures suffer from various problems, including difficulty in handling a large number of program binaries due to, for example, their limited reliability and the scale of binaries.

Conventional systems and methods, such as those discussed above, do not effectively or reliably determine similarities between programs, or similarities between benign programs and malware families accurately. Benign software has many versions for different platforms and patches. Even though their source code may be very similar, once it is compiled into the binary format, its instruction structure becomes significantly different due to, for example, algorithms and optimization of compilers.

Moreover, with respect to malicious software (malware), malware writers use variations of code (e.g., polymorphic malware code), which effectively confuses and renders conventional approaches, such as those discussed above, inaccurate and ineffective. Thus, reliable and effective characterization and similarity comparison of program binaries is an unsolved problem, as conventional approaches, such as those discussed above, are not reliable or effective enough in determining, for example, similar benign programs and malware families accurately and reliably.

In accordance with various embodiments, the present principles may be applied to extract multiple features from program binaries to quantify the characteristics of programs and compare their similarity in a blackbox way (e.g., without using any source code or debug information). In particular, in accordance with the present principles, the extracted multiple features may include (1) the reference feature, (2) the resource feature (3), the abstract control flow feature, and/or (4) the structural feature. These features represent multiple aspects of binaries in terms of referenced binaries, resource, control flow, and binary structure. Furthermore, these features are richer in the coverage of relevant characteristics than other features of the binaries, and thus are more effective to quantify the similarity of programs in a complementary way to each other.

In some embodiments, the present principles may be applied to enable an effective, accurate comparison of program binaries, which is an important feature for program whitelisting and malware clustering in cyber security systems.

With respect to program whitelisting, for diverse variation of benign programs, determining their similarities to known benign programs in accordance with the present principles is useful to reduce the complexity and increase the accuracy and effectiveness of malware detection. Multiple features of the present invention improve the process of similarity computation, as will be shown in further detail herein below.

With respect to malware clustering, a large volume of new malware is newly released and discovered on a daily basis. Manually examining all of this malware is very challenging due to high cost of human efforts, and inaccuracies and lack of ability to process such vast amounts of potential malware in a timely manner (e.g., timely enough to address these ever-changing malware variations and prevent attacks from malware variations in real time) using such human efforts and/or conventional antivirus systems. The present invention advantageously improves the quality, effectiveness, and accuracy of malware comparison and clustering in accordance with various embodiments, which will be described in further detail herein below.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, an exemplary processing system 100, to which the present principles may be applied, is illustratively depicted in accordance with one embodiment of the present principles.

The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Moreover, it is to be appreciated that systems 100, 200, 210, and 800, described with respect to FIGS. 1, 2A, 2B, and 8, respectively, are systems for implementing respective embodiments of the present principles. Part or all of processing system 100 may be implemented in one or more of the elements of systems 200, 210 and 800, according to various embodiments of the present principles.

Further, it is to be appreciated that processing system 100 may perform at least part of the method described herein including, for example, at least part of methods 200, 210, 300, 400, 500, 600, and 700 of FIGS. 2A, 2B, 3, 4, 5, 6, and 7, respectively. Similarly, part or all of system 800 may be used to perform at least part of methods 200, 210, 300, 400, 500, 600, and 700 of FIGS. 2A, 2B, 3, 4, 5, 6, and 7, respectively, according to various embodiments of the present principles.

Referring now to FIG. 2A, a high-level method 200 for program binary feature extraction is illustratively depicted in accordance with an embodiment of the present principles.

In one embodiment, one or more program binaries may be input in block 202. In block 204, program binary feature extraction may be performed to generate hybrid binary features, and the hybrid binary features may be output in block 206, in accordance with the present principles.

Referring now to FIG. 2B, a high-level method 210 for hybrid feature similarity analysis is illustratively depicted in accordance with an embodiment of the present principles.

In one embodiment, one or more generated hybrid binary features may be input in blocks 212, 214, and/or 216, and one or more hybrid feature parameters may be input in block 218. In block 220, the features 212, 214, 216 and the feature parameters 218 may be employed to determine the similarity of two or more program binaries in accordance with the present principles. A similarity vector based on the hybrid feature similarity analysis 220 may be output in block 222. The similarity vector output in block 222 may be employed to, for example, provide real-time malicious software (malware) definition comparisons and updates for detection and prevention of malware attacks in accordance with various embodiments.

Figure 3:
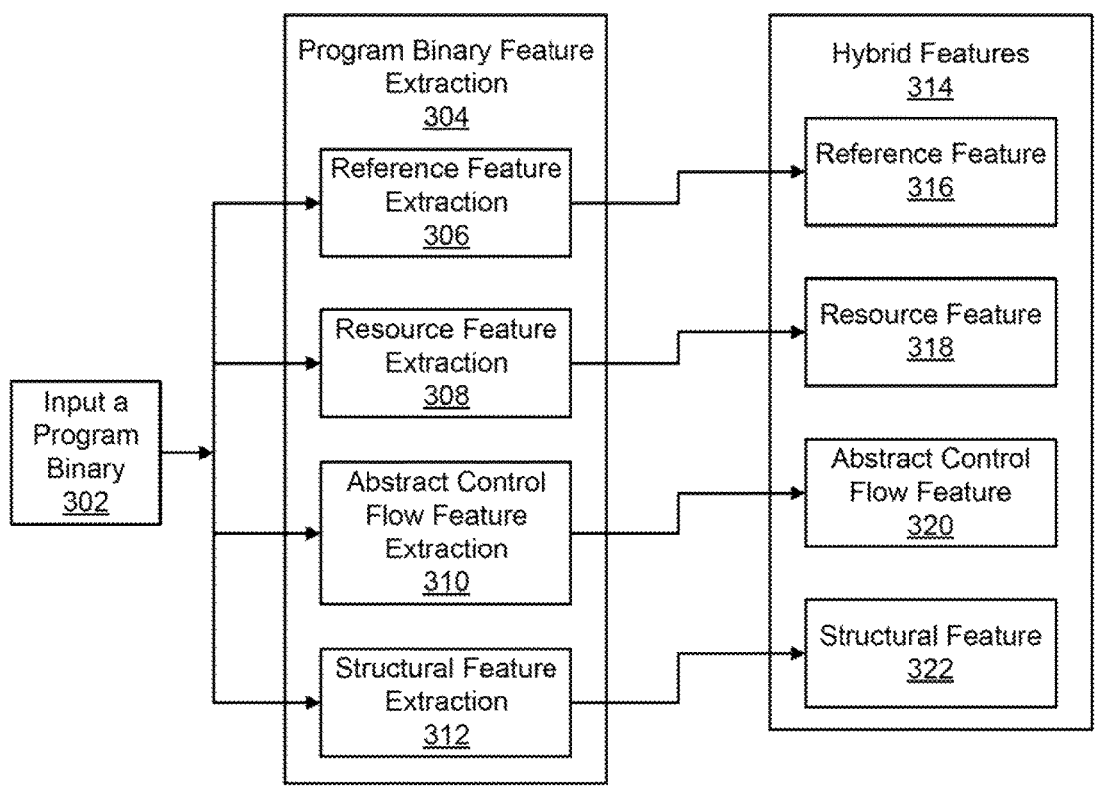
FIG. 3 is a block/flow diagram illustrating a method for program binary feature extraction, in accordance with the present principles.

Referring now to FIG. 3, a method 300 for program binary feature extraction is illustratively depicted in accordance with an embodiment of the present principles.

In one embodiment, one or more program binaries may be input in block 302, and program binary features may be extracted in block 304 in accordance with the present principles. In accordance with various embodiments, the hybrid binary features extracted from program binaries 314 may include one or more of reference features 316, resource features 318, abstract control flow features 320, and structural features 322. The hybrid features may be extracted using a corresponding extraction function, including reference feature extraction 306, resource feature extraction 308, abstract control flow feature extraction 310, and structural feature extraction 312 in accordance with the present principles. The output may be stored as individual features in the hybrid features in accordance with various embodiments.

For ease of illustration, the following representations are employed for various features of the present system and method:

P: an input program binary 302
F_F(P): Reference feature 316 for a program binary P
F_R(P): Resource feature 318 for a program binary P
F_C(P): Abstract control feature 320 for a program binary P
F_S(P): Structural feature 322 for a program binary P In one embodiment, hybrid binary features 314 for a program P are a four-tuple of a reference feature, a resource feature, an abstract control feature, and a structural feature for Program P, as shown below:

HF(P)=(F_F(P), F_R(P), F_C(P), F_S(P))

Similarities of the hybrid features may be represented as follows:

Similarity of Reference Features 316 of Program P1, P2:
Sim_F(F_F(P1), F_F(P2))
Its input is two reference features of Program P1 and P2.
This value is between 0 (0%) and 1 (100%).
Similarity of Resource Features 318 of Program P1, P2:
Sim_R(F_R(P1), F_R(P2))
Its input is two resource features of Program P1 and P2.
This value is between 0 (0%) and 1 (100%).
Similarity of Abstract Control Flow Features 320 of Program P1, P2:
Sim_C(F_C(P1), F_C(P2))
Its input is two abstract control flow features of Program P1, P2:
This value is between 0 (0%) and 1 (100%).
Similarity of Structural Features 322 of Program P1, P2:
Sim_C(F_C(P1), F_C(P2))
Its input is two structural features of Program P1, P2:
This value is between 0 (0%) and 1 (100%).

In accordance with various embodiments, program binary feature extraction 304 may be performed as follows:

Given the following:
P: an input program binary
F_F(P): Reference feature for a program binary P
F_R(P): Resource feature for a program binary P
F_C(P): Abstract control feature for a program binary P
F_S(P): Structural feature for a program binary P In one embodiment, reference feature extraction 306 may be performed as follows:

```
Extract_F_F(P)//Extract Reference Feature from a Program binary P
   ListOfReferences=[ ]//empty set
   Sections=Get the list of binary sections of Program P
   For each section in Sections:
      If section is a reference table (For example, import Table, GOT in ELF)
         For each entry in section:
            program=getReferredProgram(entry)
            function=getReferredFunctionName(entry)
            ListOfReferences.add(pair(program, function))
   Return ListOfReferences//This is F_F(P).
```

In one embodiment, resource feature extraction 308 may be performed as follows:

```
Extract_F_R(P)//Extract Resource Feature from a Program binary P
   ListOfResource=[ ]//empty set
   Sections=Get the list of binary sections of Program P
   For each section in Sections:
      If section has resource (E.g., String, Symbol, Global Data, Icon, etc.)
         kind=getKind(section)
         For each entry in section:
            value=getValue(entry)
            ListOfResource.add(pair(kind, value))
   Return ListOfResource//This is F_R(P)
```

In one embodiment, abstract control feature extraction 310 may be performed as follows:

```
Extract_F_C(P)//Extract Abstract Control Flow Feature from a Program binary P
   ListOfACF=[ ]//empty set
   Sections=Get the list of binary sections of Program P
   For each section in Sections:
      If section is a code section
         DisassembledInstructions=Disassemble(section)
         For each instruction in DisassembledInstructions:
            If instruction is control dependent
               ACF=getOpCode(instruction)
               ListOfACF.add(ACF)
   Return ListOfACF//This is F_C(P)
```

In one embodiment, structural feature extraction 312 may be performed as follows:

```
Extract_F_S(P)//Extract Structural Feature from a Program binary P
   ListOfSections=[ ]//empty set
   Sections=Get the list of binary sections of Program P
   For each section in Sections:
      name=getSectionName(section)
      size=getSectionSize(section)
      ListOfSections.add(pair(name, size))
   Return ListOfSections//This is F_S(P)
```

The above four-tuple of features is used in accordance with the present principles at least because reference features show relations with libraries; resource features show common strings or messages which can be shared in different versions of the same program or in similar programs; abstract control flow features show the similarity of program instructions with less noise, and the structural features show the similarity of overall program structure by comparing the section information, and are thus useful in, for example, detecting similarities between programs to prevent malware attacks in accordance with the present principles.

Figure 4:
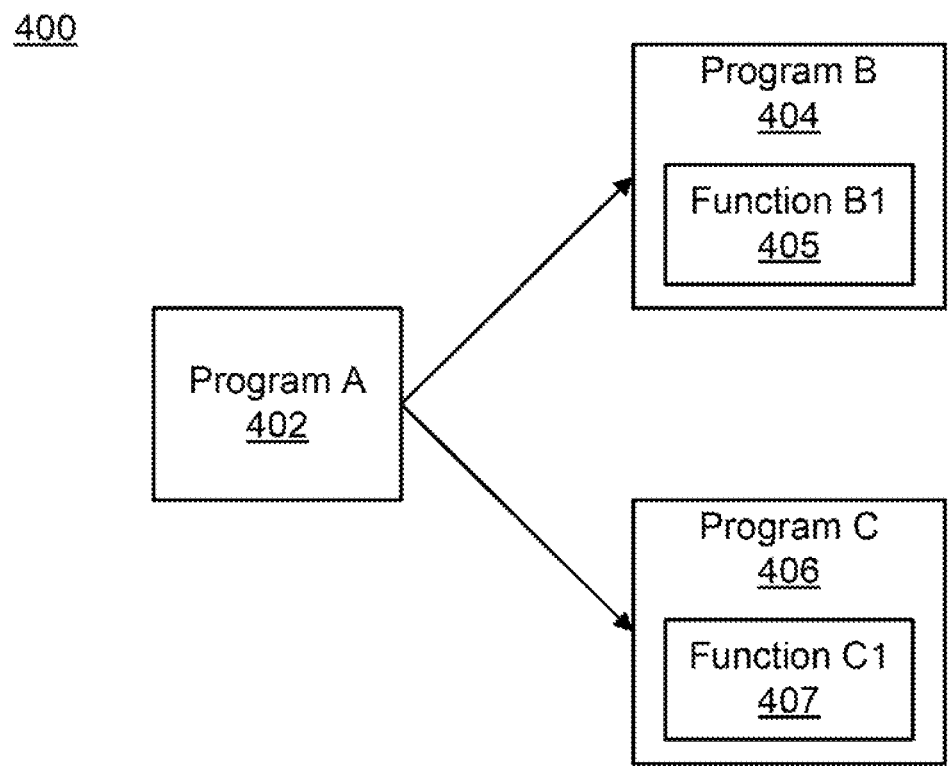
FIG. 4 is a block/flow diagram illustrating exemplary reference features for program binary feature extraction, in accordance with the present principles.

Referring now to FIG. 4, a diagram 400 of exemplary reference features for program binary feature extraction is illustratively depicted in accordance with the present principles.

Most programs use library code which is stored in separate program binaries. This feature represents functional dependency to related program binaries. A program has a binary section that describes what other binaries, and more specifically, which functions should be found, and bind to operate properly.

For example, in the Executable and Linkable Format (ELF) binary format, which is popular in Linux platforms, the Import Table, and the Global Offset Table (GOT) may be used to collect this information. Other binary formats have similar binary sections or tables.

In one exemplary embodiment, Program A 402 uses the function B1 405 of Program B 404, and the function C1 407 of Program C 406. A reference feature from this exemplary program is shown in more detail in block 410.

Referring again to FIG. 3, exemplary resource features 318 are shown in Table 1, below:

TABLE 1

Resource Features

| Kind | Value |
|---|---|
| String | "Version 1.0.1" |
| String | Usage: Program |
| Symbol | Function A |
| Global data | 192.168.1.0 |
| Global data | 255 |
| Icon | Binary data |

Programs employ various resources which are embedded in the program binary. Some of these resources are data which are used in programs. For example, global data, program metadata, program icon, strings, debug symbols, etc. belong to this category of resource features 318. Such information is typically stored in separated binary sections. For example, in ELF binary format, read-only data section and symbol table sections are used for such information.

As shown in Table 1, in this example of resource features, this table has a column of the Kind, where the data is from actual measured and/or received Values. This example shows several strings, a program function symbol, global data from read only section, and an icon data which belong to the metadata.

Figure 5:
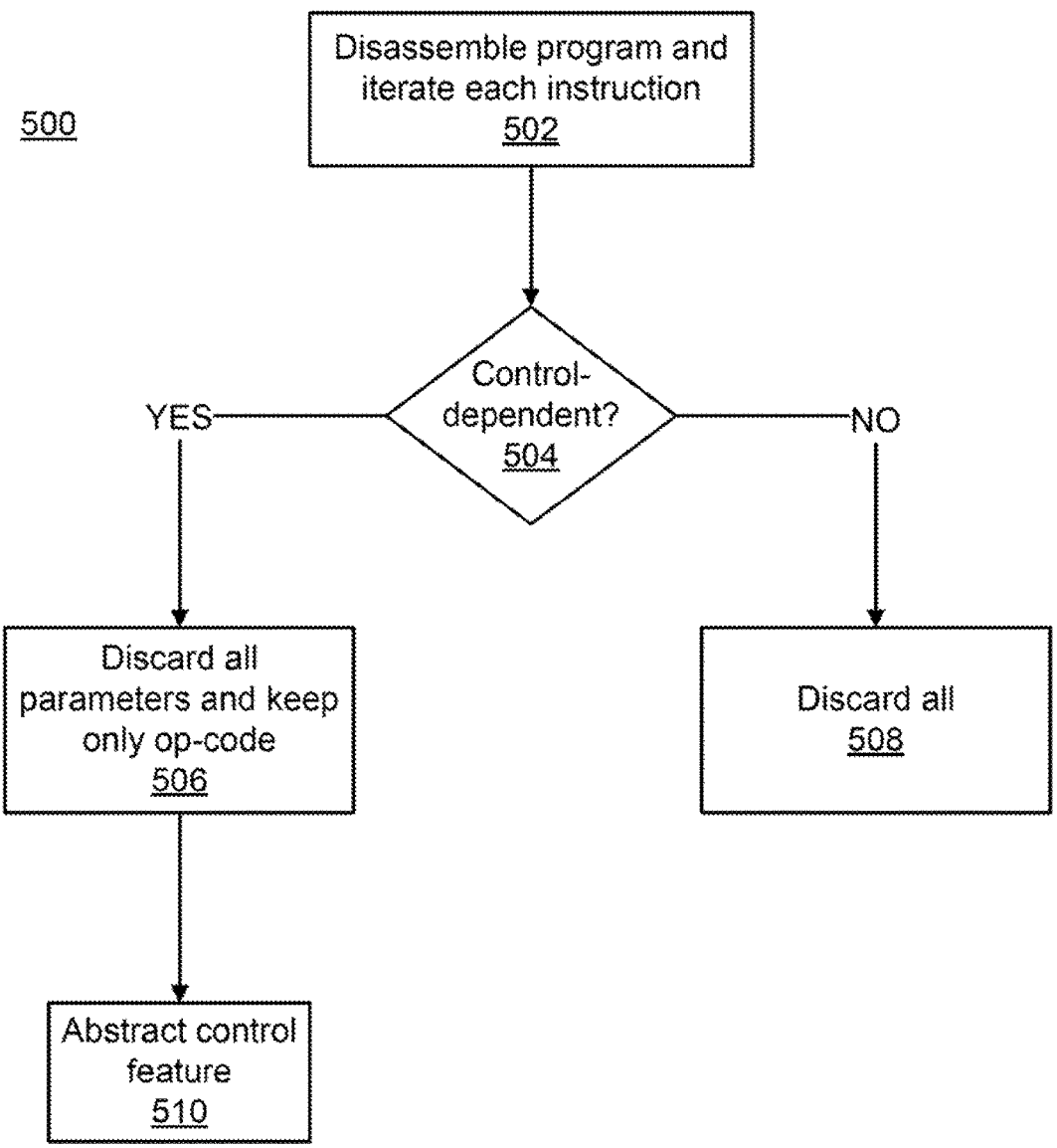
FIG. 5 is a block/flow diagram illustrating a method for generation of abstract control features, in accordance with the present principles.

Referring now to FIG. 5, a method 500 for generation and extraction of abstract control flow features is illustratively depicted in accordance with the present principles.

In one embodiment, a given program is disassembled, and an algorithm iterates each instruction in block 502. If the instruction is not determined to be a control dependent instruction (e.g., arithmetic) in block 504, it is discarded in block 508. If the instruction is determined to be a control dependent instruction in block 504, only op-code is taken and included in the abstract control flow feature in accordance with various embodiments of the present principles, as shown in the exemplary Pseudocode 1, below.

Pseudocode 1: Generation of Abstract Control Flow Features

```
4028b0: mov    $0x413c98,%edi
4028b5: callq  402450
4028ea: xor    %eax,%eax
402905: mov    $0x413800,%edi
402290: callq  402340
402297: je     403203
402994: test   %eax,%eax
4029a6: jmp    4029e5
402bc4: movl   $0x0,0x218582(%rip)
4048d6: retq
```

Control flow information (e.g., function calls, returns, jumps and system calls) are important descriptions that represent their behavior. However, using their full information can be too noisy because certain details can be sensitively changed only due to minor changes. For example, program instructions use jumps to other subroutines, and their locations at the binary are subject to change with a small code patch. Therefore, in accordance with various embodiments of the present principles, a subset of control flow information is employed, and as such, is more resilient on sensitive changes than if the full information is employed. A subset of instruction information, including op codes but without instruction parameters for control-dependent instructions (e.g., jump, call, and return instructions) may be employed in accordance with various embodiments. Non-control dependent instructions are not used in the above-discussed embodiment.

Referring again to FIG. 3, exemplary structural features 322 are shown in Table 2, below:

TABLE 2

Structural Features

| Section Name | Section Size |
|---|---|
| .gnu.hash | 104 |
| .dynsym | 3096 |
| .init | 26 |
| .plt | 1808 |
| .text | 63066 |
| .fini | 9 |
| .got.plt | 920 |
| .data | 596 |
| .bss | 3424 |
| .rodata | 20732 |

Another feature of binaries is the structure information of the binary. The characteristics of binary sections (e.g., the name, size, and the number of binary sections) are used as one of structural features 322 in accordance with the present principles. As detailed in Table 2 in the exemplary table of structural features 322, one column shows the names of binary sections, and another column shows the sizes of the binary sections.

Figure 6:
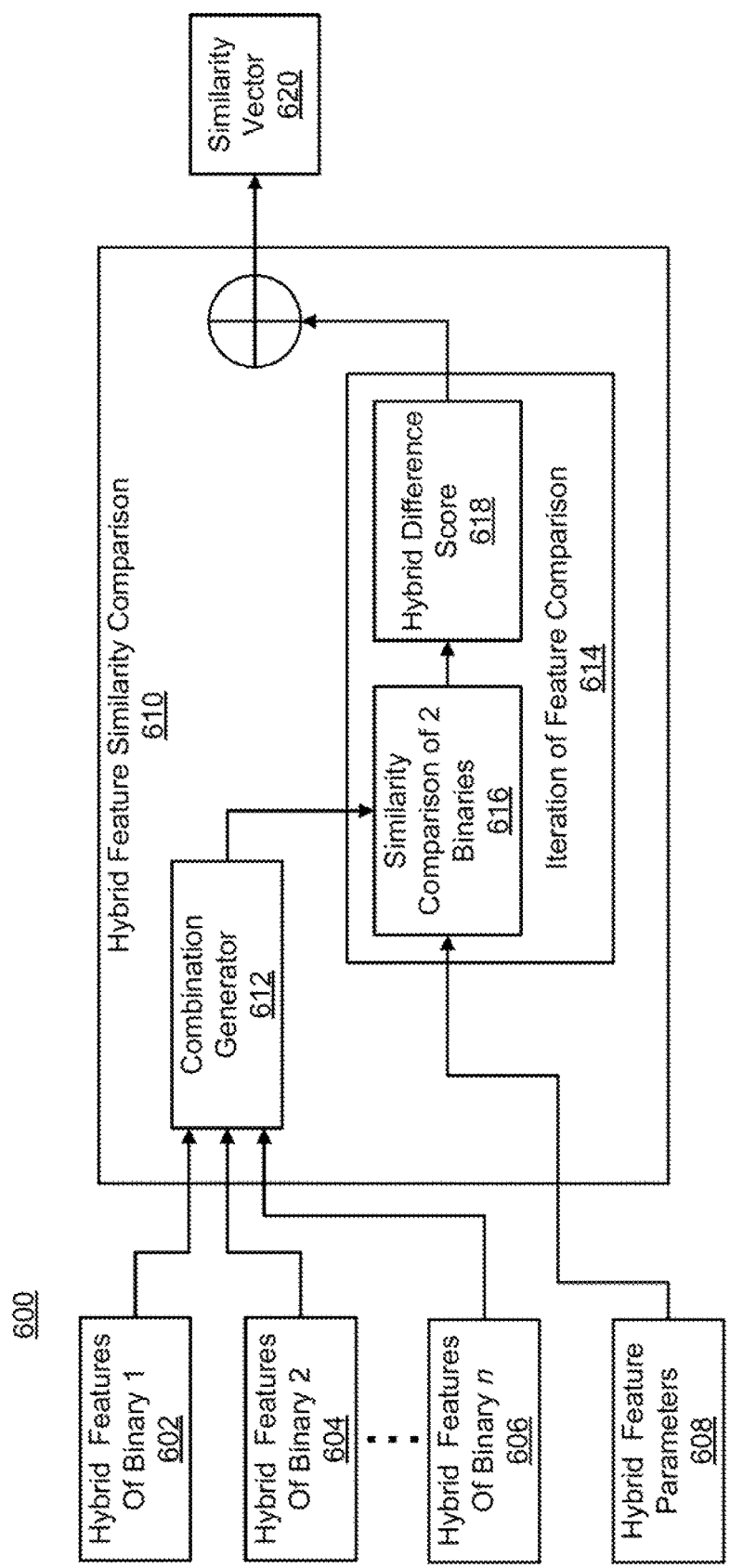
FIG. 6 is a block/flow diagram illustrating a method for hybrid feature similarity comparison, in accordance with the present principles.

Referring now to FIG. 6, a system and method 600 for hybrid feature similarity comparison is illustratively depicted in accordance with the present principles.

In accordance with various embodiments, hybrid features of program binaries may be employed for comparing and determining a similarity of a plurality of characteristics of binaries (e.g., to detect and/or prevent malware attacks) in accordance with the present principles. In blocks 602, 604, and 606, a set of N hybrid features, which are generated from a plurality (e.g., N) program binaries, and one or more hybrid feature parameters 608 (e.g., a set of rates determining the contribution of each feature in the comparison) may be input for hybrid feature similarity comparison in block 610.

The hybrid feature parameters 608 may be represented as follows:

$C\_F$: a parameter for reference feature
$C\_R$: a parameter for resource feature
$C\_C$: a parameter for abstract control flow feature
$C\_S$: a parameter for structural feature
$C\_F, C\_R, C\_C, C\_S$ are a ratio between 0 and 1.
$C\_F+C\_R+C\_C+C\_S=1$
$C\_F\_P$: a threshold to match similar program references
$C\_F\_F$: a threshold to match similar function references In one embodiment, a combination generator 612 is configured to generate combinations for every possible pair of binaries. For each two binaries (e.g., pair), a similarity comparison is performed in block 616 to generate a hybrid difference score in block 618. The similarity comparison (e.g., feature comparison) is iterated in block 614 for one or more of the pairs of binaries, and a similarity vector is generated and output in block 620 for use in, for example, detection and prevention of malware attacks, in accordance with the present principles.

In accordance with the present principles, the hybrid feature similarity comparison in block 610 may be performed as follows:

Hybrid_Feature_Similarity_Comparison (HFList, HFIndex, C_F, C_R, C_C, C_S, C_F_P, C_F_F)
Explanation of Input Parameters:
(1) A list of hybrid features of binary P1, P2, . . . , PN
   HFList=[HF(P1), HF(P2), . . . , HF(PN)]
(2) Index of binaries
   HFIndex=[P1, P2, . . . , PN]
(3) Hybrid Feature Parameters C_F, C_R, C_C, C_S, C_F_P, C_F_F
SimilarityVector (Component 620)=an empty N*N vector having N rows and N columns.
Combination Generator 612:
//Make N*N combinations of P1, P2, . . . , PN excluding the comparison to itself and duplicates
CombinationList=GenerateCombination(HFIndex)
Iteration of Feature Comparison 614:
For each (PX, PY) in CombinationList:
   //(Component 616, 618), Note: Definition of Component 618 follows.
   HybridDiffScore (component 618)=HDS(HF(PX), HF(PY), C_F, C_R, C_C, C_S, C_F_P, C_F_F)
   SimilarityVector [PX, PY]=HybridDiffScore
return SimilarityVector (Component 620)

As shown above, the hybrid difference score 618 represents a similarity between two binaries, and the scores of all combinations may be stored in a similarity vector 620.

In some embodiments, clusters of binaries are produced by applying, for example, clustering algorithms to the data stored in the similarity vector in accordance with the present principles.

Figure 7:
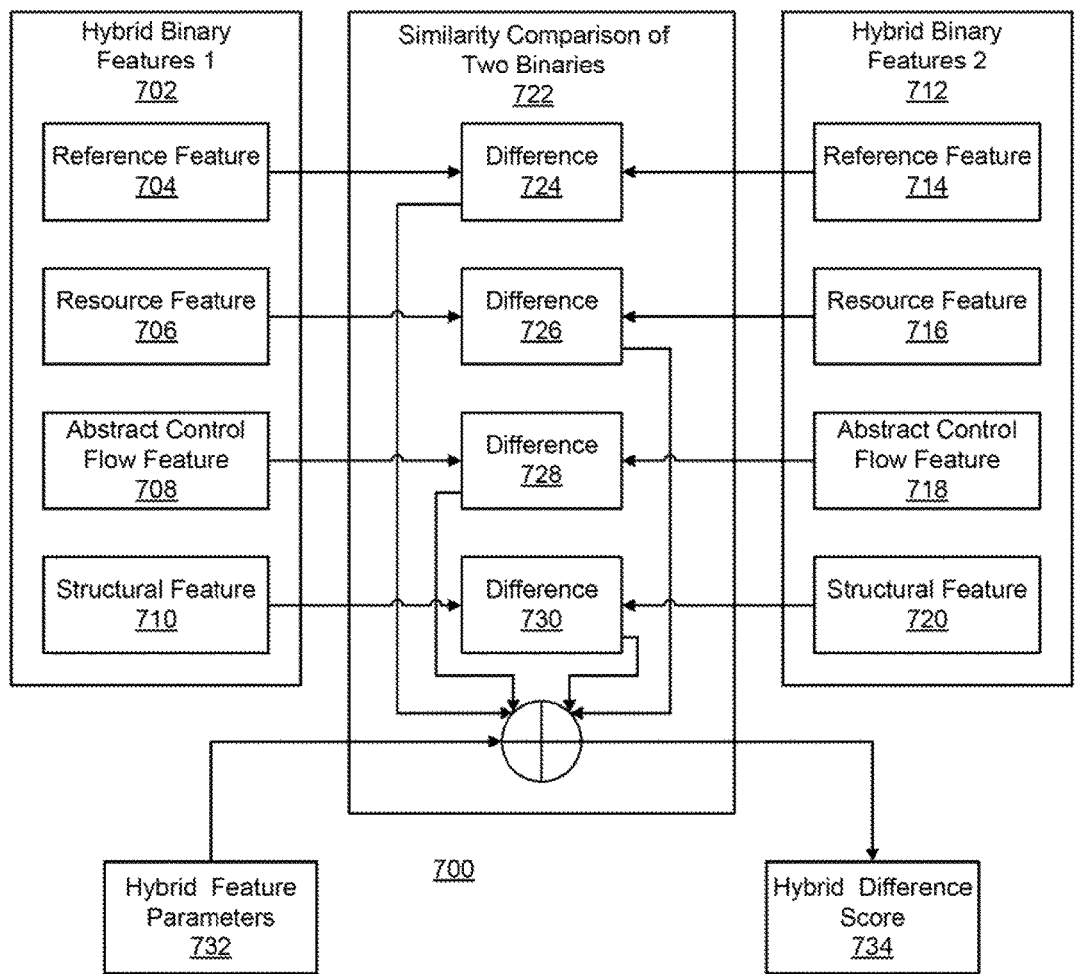
FIG. 7 is a block/flow diagram illustrating a method for similarity comparison of two binaries, in accordance with the present principles.

Referring now to FIG. 7, a method 700 for similarity comparison of two binaries is illustratively depicted in accordance with the present principles.

In one embodiment, a similarity comparison of two hybrid binary features 702, 712 is performed in block 722 in accordance with the present principles. A comparison is performed between two features of the same kind (e.g., reference feature 704, 714; resource feature 706, 716; abstract control flow feature 708, 718; and structural feature 710, 720) to determine a difference score value between the features of the same kind in blocks 724, 726, 728, and 730, respectively.

The difference score values 724, 726, 728, and 730 are employed for determining a determined hybrid difference score in block 734 by, for example, multiplying values of the hybrid feature parameters 732 with the difference score values 724, 726, 728, and 730 in accordance with various embodiments of the present principles.

In one embodiment, the hybrid difference score 734 between program binary P1 and P2 may be determined as follows:
HDS(HF(P1), HF(P2), C_F, C_R, C_C, C_S, C_F_P, C_F_F)=C_F*Sim_F(F_F(P1), F_F(P2), C_F_P, C_F_F)+C_R*Sim_R(F_R(P1), F_R(P2))+C_C*Sim_C(F_C(P1), F_C(P2))+C_S*Sim_S(F_S(P1), F_S(P2))

The definitions of Sim_F, Sim_R, Sim_C, and Sim_S are provided herein below.

In one embodiment, the similarity comparison 724 of reference features 704, 714 of Program P1, P2 may be performed as follows:
Sim_F(F_F(P1), F_F(P2), C_F_P, C_F_F)
   Total=Min(|F_F(P1)|, |F_F(P2)|)
   Count=0
   For (RP1, RF1) from F_F(P1)
      For (RP2, RF2) from F_F(P2)
         If (Difference(RP1, RP2)<=C_F_P and Difference(RF1, RF2)<=C_F_F)
            Count+=1
   return Count/Total
where RP represents program reference, and RF represents function reference.

In one embodiment, the similarity comparison 726 of resource features 706, 716 of Program P1, P2 may be performed as follows:
Sim_R(F_R(P1), F_R(P2))
   Total=Min(|F_R(P1)|, |F_R(P2)|)
   Count=0
   For (K1, V1) from F_R(P1)
      For (K2, V2) from F_R(P2)
         If(K1=K2 and V1=V2)
            Count+=1
   return Count/Total,
where K represents Kind, and V represents Value In one embodiment, the similarity comparison 728 of abstract control flow features 708, 718 of Program P1, P2 may be performed as follows:
Sim_C(F_C(P1), F_C(P2))
   Score=|LongestCommonSubsequence(F_C(P1), F_C(P2))|/min(|F_C(P1)|, |F_C(P2)|)
   return Score In one embodiment, the similarity comparison 730 of structural features 710, 720 of Program P1, P2 may be performed as follows:
Sim_S(F_S(P1), F_S(P2))
   Scores=[ ]
   For (Sec_1, size_1) from F_S(P1)
      For (Sec_2, size_2) from F_S(P2)
         if (Sec_1=Sec_2)
            Score=|size_1−size_2|/max(size_1, size_2)
            Scores.push(Score)
   Sum=0, Count=0
   For score from Scores:
      Sum+=score
      Count+=1
   return Sum/Count In accordance with various embodiments, thresholds may be employed to, for example, match similar program and function names in the comparison of the reference feature 724. For example, the different versions of the same library (e.g., LibX_V1 and LibX_V2) can be matched using thresholds. Corresponding two thresholds are added as C_F_P, and C_F_F.

Figure 8:
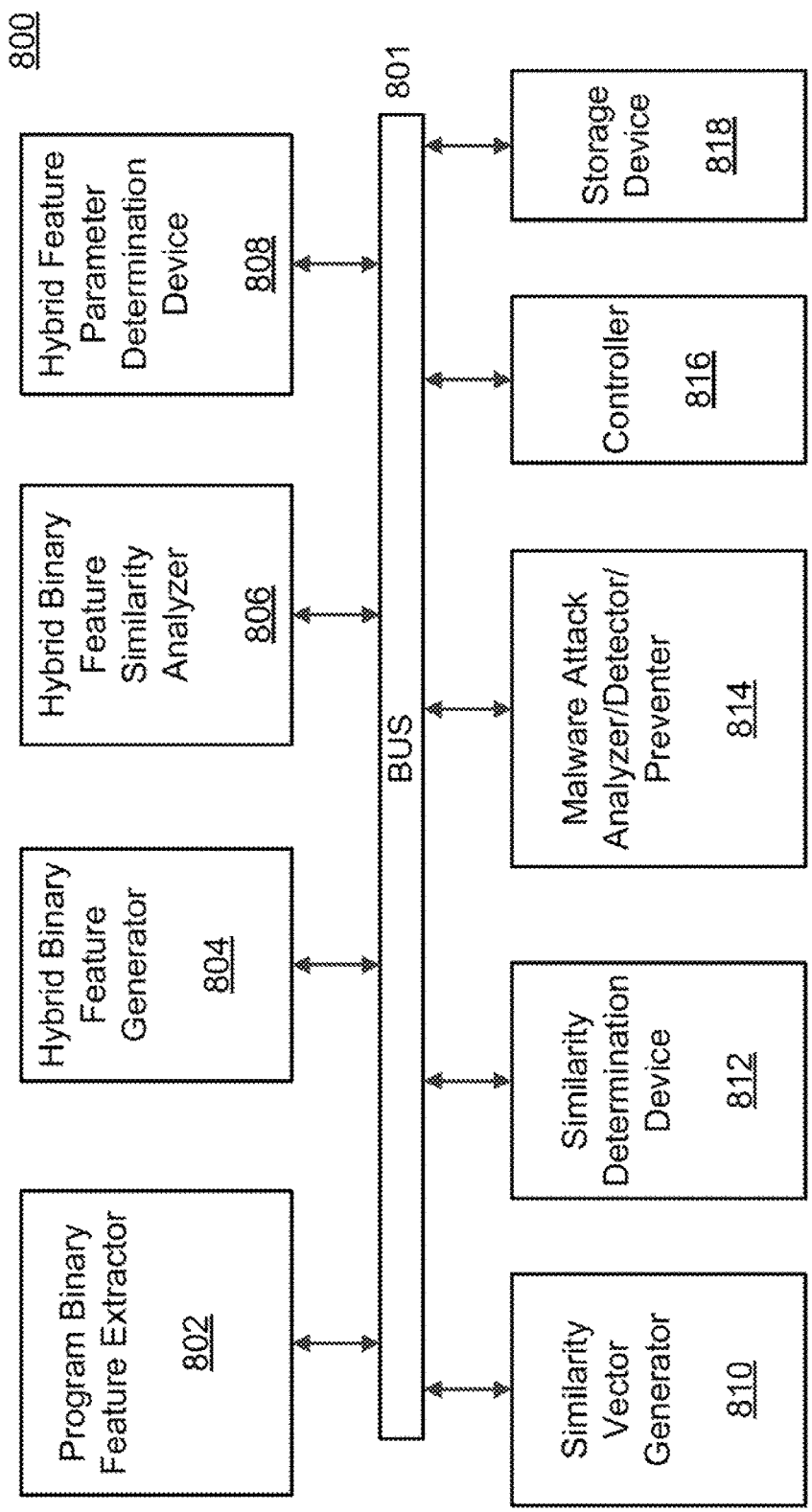
FIG. 8 is a block/flow diagram illustrating a system for extraction and comparison of hybrid program binary features, in accordance with the present principles.

Referring now to FIG. 8, an exemplary system 800 for extraction and comparison of hybrid program binary features is illustratively depicted in accordance with the present principles.

While many aspects of system 800 are described in singular form for the sakes of illustration and clarity, the same can be applied to multiples ones of the items mentioned with respect to the description of system 800. For example, while a single controller 816 is described, more than one controller 816 can be used in accordance with the teachings of the present principles, while maintaining the spirit of the present principles. Moreover, it is appreciated that storage device 818 is but one aspect involved with system 800 than can be extended to plural form while maintaining the spirit of the present principles.

In accordance with the present principles may be used for, e.g., program whitelisting, determining characteristics of an unknown binary, determining likelihood of malicious functionalities, and malware clustering in accordance with various embodiments of the present principles.

With respect to program whitelisting, this may be accomplished by determining the variations or different versions of software. Software companies and developers produce diverse versions of software for bug fixes, security updates, and new features. For example, if a company updates a binary once in several weeks or several months, if we take all binary information inside an enterprise, there could be from dozens to hundreds different versions of a program.

This invention can determine the similarities of such programs. Knowing different versions of benign software is helpful to exclude them from the comparison with malicious thus reducing the complexity of malware detection.

For example, among 10,000 binaries, we determine 4,000 are the variations of 500 known benign binaries. Thus we can examine only 6,000 binaries for malware after white listing 4,000 binaries.

With respect to determining characteristics of a unknown binary, when an unknown software binary is encountered, we do not know what is its characteristics (e.g., whether it is a utility program, a word processor, or a malware). If we use this invention to compare an unknown binary with a list of software that we know, we can accurately determine the characteristics of the binary. For example, if we get the following similarities in the comparison with other software:
   Similarity between an unknown program and a file search utility 20%
   Similarity between an unknown program and a network utility 80%, it is determined that this program may have network functionalities and file search functions in accordance with the present principles.

With respect to estimating a likelihood of malicious functionalities, an unknown binary may be compared with a list of malicious software binaries and determine possibilities that the binary may have malicious functionalities. For example:
   Similarity between an unknown program and malware X: 50%
   Similarity between an unknown program and a file search utility: 20%
   Similarity between an unknown program and a network utility: 30%
Thus, it may be determined that there is a chance (e.g., likelihood percentage) that this program may have malicious functions seen in malware X.

With respect to malware clustering, when an unknown binary shows similarity with multiple kinds of malicious software, this invention helps us to understand the category of the malware by malware clustering for use in antivirus applications. For example:
   Similarity between an unknown program and malware family 1: 70%
   Similarity between an unknown program and malware family 2: 27%
   Similarity between an unknown program and malware family 3: 3%
Thus, it may be determined that this binary is more closely related to the malware family 1 than to the malware family 2 or 3, and antivirus/anti-malware applications may be updated/applied accordingly to detect and prevent malicious software attacks in accordance with the present principles.

The system 800 can include a bus 801, which may be connected to one or more computing networks and/or storage devices 818. A program binary feature extractor 802 may be employed for extraction of binary features, and hybrid features may be generated using a hybrid binary feature generator 804. The hybrid binary features may be analyzed using a hybrid binary feature similarity analyzer 806, which may further take as input hybrid feature parameters provided by, for example, a hybrid feature parameter determination device 808.

In accordance with various embodiments, a similarity determination device 812 may be employed to determine a difference between pairs of binaries, and a similarity vector generator 810 generates and outputs similarity score vectors based on the similarity comparison. The similarity vectors generated may be employed (e.g., in real-time, in the future) for malware attack protection in a malware attack analyzer, detector, and preventer 814, which may be controlled by a controller 816, for instructing (e.g., manually or automatic) antivirus software to, for example, update malware definitions based on the similarity vectors, quarantine malware detected by the updated malware definitions, etc. A storage device 818 may be employed to store updated malware definitions, results of similarity comparison, etc. for use in, for example, detecting and preventing malware attacks in accordance with various embodiments of the present principles.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for identifying similarities in program binaries, comprising:
   extracting program binary features from one or more input program binaries to generate corresponding hybrid features, the hybrid features including a reference feature, a resource feature, an abstract control flow feature, and a structural feature;
   generating combinations of a plurality of pairs of binaries from the extracted hybrid features;
   determining a similarity score for each of the pairs of binaries;
   generating a hybrid difference score based on the similarity score for each of the binaries combined with input hybrid feature parameters; and
   identifying a likelihood of malware in the input program binaries based on the hybrid difference score.

2. The method as recited in claim 1, wherein the plurality of pairs of binaries includes all possible pairs of binaries for the extracted hybrid features.

3. The method as recited in claim 1, further comprising updating malware definition libraries in anti-malware software if a predetermined threshold hybrid difference score is reached.

4. The method as recited in claim 1, wherein the reference feature comprises at least one of a list of referenced programs and referenced functions from the input program.

5. The method as recited in claim 1, wherein the resource feature includes at least one of global data, program metadata, program icon, strings, and debug symbols.

6. The method as recited in claim 1, further comprising disassembling the input program, and iterating each of a plurality of instructions to determine the abstract control flow feature.

7. The method as recited in claim 6, wherein if the instructions are control dependent, only op-code is retrieved and included in the abstract control flow feature.

8. The method as recited in claim 1, wherein the structural feature comprises at least one of a list of the names of binary sections and the sizes of binary sections.

9. The method as recited in claim 1, wherein the hybrid feature parameters are a set of predetermined rates which set forth a contribution amount of each of the features when generating the hybrid difference score.

10. A system for identifying similarities in program binaries, comprising:
a processor coupled to a memory, the processor being configured to:
    extract program binary features from one or more input program binaries to generate corresponding hybrid features, the hybrid features including a reference feature, a resource feature, an abstract control flow feature, and a structural feature;
    generate combinations of a plurality of pairs of binaries from the extracted hybrid features;
    determine a similarity score for each of the pairs of binaries;
    generate a hybrid difference score based on the similarity score for each of the binaries combined with input hybrid feature parameters; and
    identify a likelihood of malware in the input program binaries based on the hybrid difference score.

11. The system as recited in claim 10, wherein the plurality of pairs of binaries includes all possible pairs of binaries for the extracted hybrid features.

12. The system as recited in claim 10, wherein the processor is further configured to update malware definition libraries in anti-malware software if a predetermined threshold hybrid difference score is reached.

13. The system as recited in claim 10, wherein the reference feature comprises at least one of a list of referenced programs and referenced functions from the input program.

14. The system as recited in claim 10, wherein the resource feature includes at least one of global data, program metadata, program icon, strings, and debug symbols.

15. The system as recited in claim 10, wherein the processor is further configured to disassemble the input program, and iterating each of a plurality of instructions to determine the abstract control flow feature.

16. The system as recited in claim 15, wherein if the instructions are control dependent, only op-code is retrieved and included in the abstract control flow feature.

17. The system as recited in claim 10, wherein the structural feature comprises at least one of a list of the names of binary sections and the sizes of binary sections.

18. The system as recited in claim 10, wherein the hybrid feature parameters are a set of predetermined rates which set forth a contribution amount of each of the features when generating the hybrid difference score.

19. A non-transitory computer readable storage medium comprising a computer readable program for identifying similarities in program binaries, wherein the computer readable program when executed on a computer causes the computer to perform the steps of:
    extracting program binary features from one or more input program binaries to generate corresponding hybrid features, the hybrid features including a reference feature, a resource feature, an abstract control flow feature, and a structural feature;
    generating combinations of a plurality of pairs of binaries from the extracted hybrid features;
    determining a similarity score for each of the pairs of binaries;
    generating a hybrid difference score based on the similarity score for each of the binaries combined with input hybrid feature parameters; and
    identifying a likelihood of malware in the input program binaries based on the hybrid difference score.

20. The non-transitory computer readable storage medium as recited in claim 19, further comprising updating malware definition libraries in anti-malware software if a predetermined threshold hybrid difference score is reached.

* * * * *